Dec. 31, 1929. T. P. CHASE Re. 17,549
INTERNAL COMBUSTION ENGINE
Original Filed June 11, 1923 4 Sheets-Sheet 1
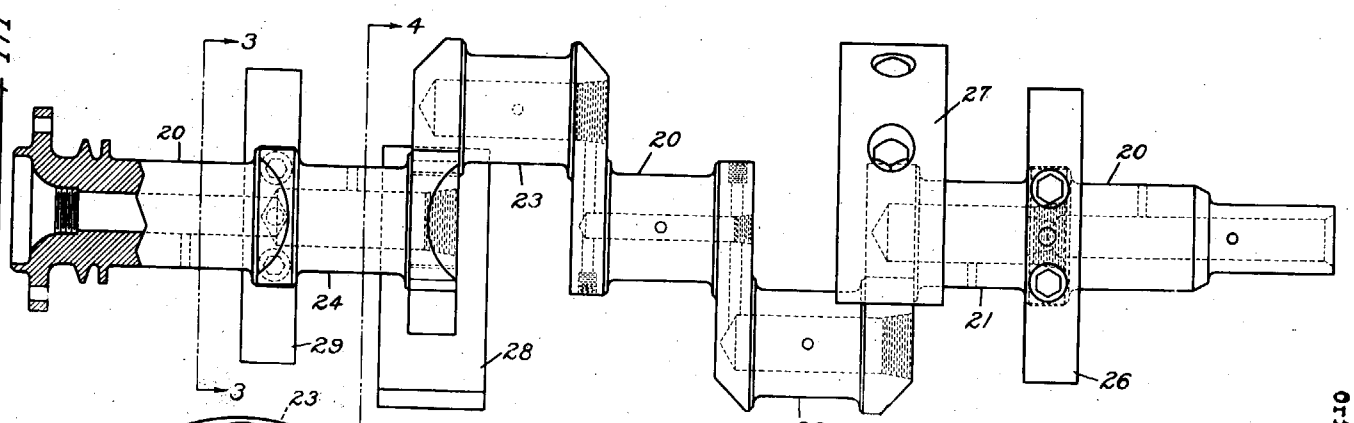
Fig. 1
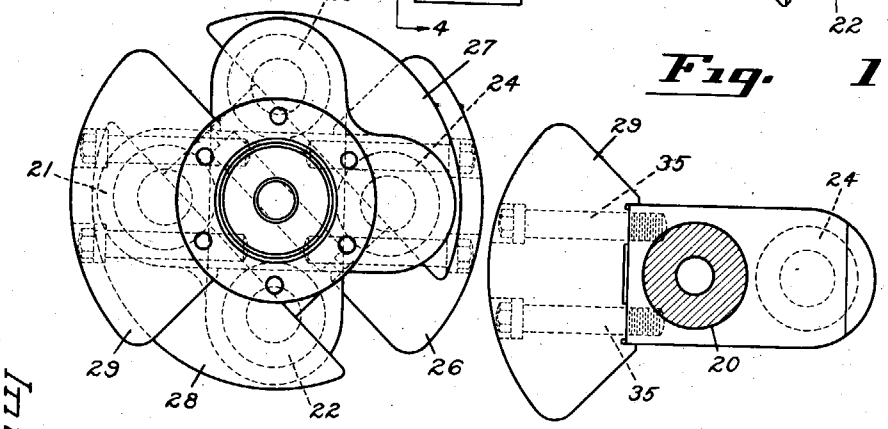
Fig. 2
Fig. 3
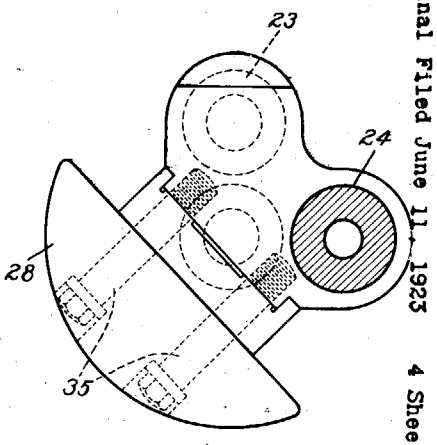
Fig. 4
Witnesses
Wm. P. Pasco
Geo. E. Pasco
Inventor
Theron P. Chase
By
Francis D. Sandesky
His Attorney Dec. 31, 1929. T. P. CHASE Re. 17,549

INTERNAL COMBUSTION ENGINE

Original Filed June 11, 1923 4 Sheets-Sheet 2

TWO COUPLES 187.5 LBS. INCHES OPPOSE EACH OTHER

Witnesses
Wm. P. Pasco
Geo. E. Pasco.

Inventor
Thos. P. Chase
By
Francis D. Hardesty
His Attorney

Dec. 31, 1929. T. P. CHASE Re. 17,549

INTERNAL COMBUSTION ENGINE

Original Filed June 11, 1923 4 Sheets-Sheet 3

Witnesses
Wm. V. Pasco.
Geo. E. Pasco.

Inventor
Theron P. Chase
By
Francis D. Hardesty
His Attorney

Dec. 31, 1929. T. P. CHASE Re. 17,549

INTERNAL COMBUSTION ENGINE

Original Filed June 11, 1923 4 Sheets-Sheet 4

RESULTANT PRIMARY INERTIA FORCES AT SPEED OF 1000 R. P. M. FOR CRANK POSITIONS 15° APART.

RESULTANT SECONDARY INERTIA FORCES AT SPEED OF 1000 R. P. M. FOR CRANK POSITIONS 15° APART.

Witnesses
Wm. F. Pasco
Geo. E. Pasco

Inventor
Theron P. Chase
By Francis D. Herdeck
His Attorney

Reissued Dec. 31, 1929

Re. 17,549

UNITED STATES PATENT OFFICE

THERON P. CHASE, OF DETROIT, MICHIGAN, ASSIGNOR TO GENERAL MOTORS RESEARCH CORPORATION, OF DAYTON, OHIO, A CORPORATION OF DELAWARE

INTERNAL-COMBUSTION ENGINE

Original No. 1,552,215, dated September 1, 1925, Serial No. 644,561, filed June 11, 1923. Application for reissue filed April 26, 1926. Serial No. 104,831.

The present invention relates to improvements in crank shafts for internal combustion engines and particularly to crank shafts for eight cylinder engines in which the cylinders are in blocks of four arranged at an angle of 90°.

Among the objects of the invention is to eliminate the objectionable vibration which has heretofore been noticeable in the operation of engines of this type.

Further objects and advantages of the present invention will be apparent from the following description, reference being had to the accompanying drawings, wherein a preferred form of embodiment of the present invention is clearly shown.

In the drawings:

Figure 1 is a plan view of a shaft constructed according to the present invention with a small portion in longitudinal section.

Figure 2 is an end view of the same looking from the left hand side of Figure 1.

Figure 3 is a sectional view on the line 3—3 of Figure 1.

Figure 4 is a sectional view on the line 4—4 of Figure 1.

Figure 5:
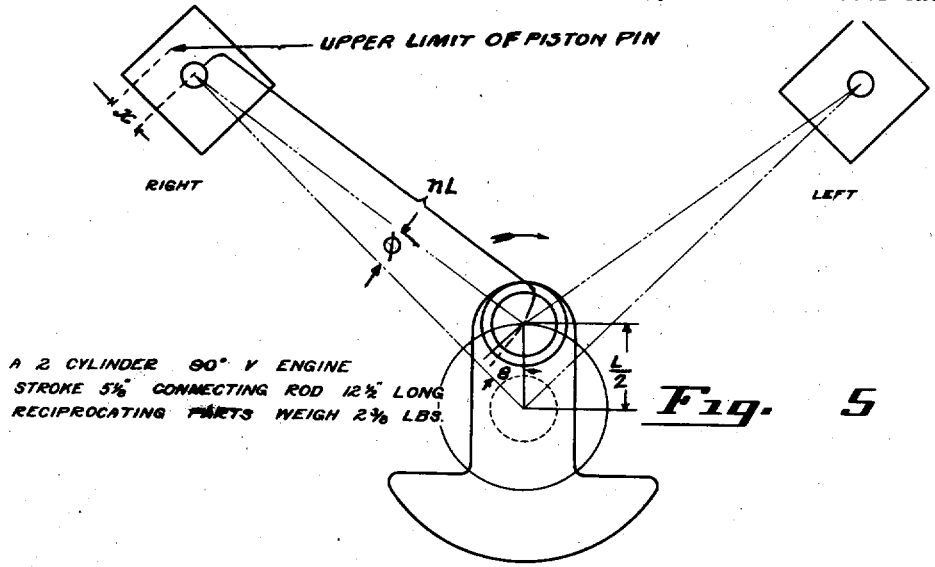
Figure 5 is a diagrammatic front end view of a single throw of a crank shaft for a 90° V-engine showing also diagrammatically the pistons and rods which are connected with this throw. In this figure "Right" and "Left" are used to indicate the banks of cylinders as viewed from the rear end or the driver's seat.

Referring to Figures 1 to 4, inclusive, the shaft illustrated is provided with the three main bearings indicated at 20 and four crank throws indicated at 21, 22, 23 and 24, respectively.

Secured to the shaft and applied in a manner to be described later are four counterweights 26, 27, 28 and 29, the weights 26 and 29 being of the form and relative size shown in Figure 3 while the weights 27 and 28 are of the form and relative size as indicated in Figure 4. In the manufacture of the shaft, a forging is made and from this the shaft is machined and separate portions are made for the weights which are secured by bolts 35 as indicated.

In order to secure proper lubrication and at the same time decrease the weight of the shaft, it is bored as shown in Figure 1, oil being pumped into the bore at the two ends and at the center main bearing, from which places it is supplied to the other bearings through suitable communicating passages and oil holes. Oil supplied in the flanged end of the shaft is supplied to the adjacent main bearing and crank throw 24 and oil pumped in at the other end of the shaft is supplied to that end bearing and crank throw 21. Oil pumped in at the center main bearings lubricates this bearing and also crank throws 22 and 23.

In order to solve the problem of balancing a crank shaft with respect to the forces applied to its crank throws which are produced by the inertia of reciprocating parts connected therewith, it is necessary to determine the force of acceleration of the reciprocating mass at various crank positions.

The exact mathematical determination of the inertia forces resulting from the motion of the piston when connected to the crank by means of the usual connecting rod of finite length is quite difficult, and the resulting expression is what is known as a "Fourier series", the general form of which is:

$$\text{Force of acceleration} = W^2R\ (\cos\theta + p_2\cos 2\theta + p_4\cos 4\theta + p_5\cos 6\theta) + \text{etc.}$$

In this equation, W = weight of reciprocating mass; R = crank radius; $\theta$ = angle of crank movement from dead center.

The values of the coefficients $p_1$, $p_2$, $p_3$, $p_4$, etc., are determined with respect to $n$, which equals the ratio of connecting rod length to crank radius $\left(\frac{1}{R}\right)$.

$$p_2 = \frac{1}{n} + \frac{1}{4n^3} + \frac{15}{128n^5} + \text{etc.}$$

$$p_4 = \frac{1}{4n^3} + \frac{3}{16n^5} + \text{etc.}$$

$$p_6 = \frac{9}{128n^5} + \text{etc.}$$

The following is a table of the values of coefficients $p$ in each of the terms of the Fourier harmonic series and three ratios of $\frac{1}{R}$:

| Harmonic | Term | $n=4$ | $n=4.5$ | $n=5$ |
|---|---|---|---|---|
| Secondary | $W^2Rp_2\cos 2\theta$ | .254 | .225 | .202 |
| Fourth | $W^2Rp_4\cos 4\theta$ | .0041 | .0028 | .0021 |
| Sixth | $W^2Rp_6\cos 6\theta$ | .000074 | .000040 | .000023 |

The first term ($W^2R\cos\theta$) or primary is not effected by the length of the connecting rod since $p$ does not appear.

The inertia force obtained from this term is known as the primary and would be the total inertia force if the rod were of infinite length.

The second term, known as the secondary inertia force has the effect of increasing the primary inertia force at the outer end of the stroke and decreasing the primary at the inner end of the stroke on account of the fact that the cosine of the angle $\theta$ is positive in the first and fourth quadrant and negative in the second and third quadrant.

In practice, all terms beyond the secondary are neglected since as shown by the above table they are of such small value and high frequency, as indicated by the coefficient of $\theta$, as to have no material effect on the balance of an engine.

P. M. Heldt, "The Gasoline Motor," volume 1, has a solution which gives very satisfactory results.

Referring to Figure 5:

X = distance piston has travelled at any instant.

L = stroke.

$\theta$ = crank angle with center line of cylinder.

$\varphi$ = angle of connecting rod with center line of cylinder.

$$n = \frac{\text{connecting rod length}}{\text{stroke}}$$

$$X = \left(\frac{L}{2} - \frac{L}{2}\cos\theta\right) + (nL - nL\cos\phi)$$

or $$X = \frac{L}{2}(1-\cos\theta) + nL\left(1 - \sqrt{1 - \frac{\sin^2\theta}{4n^2}}\right)$$

This expression gives the distance the piston has travelled for any crank position in terms of L, $n$ and $\theta$.

The instantaneous velocity of the piston is the differential of this expression with respect to time. To differentiate this expression it is expedient to add the very small term $\frac{\sin^4\theta}{64n^4}$ to the root in the second term in order to complete the square, and thus avoid the use of the Fourier series.

$$\sqrt{1 - \frac{\sin^2\theta}{4n^2} + \frac{\sin^4\theta}{64n^4}} = 1 - \frac{\sin^2\theta}{8n^2}$$

therefore $$X = \frac{L}{2}(1-\cos\theta) + nL\left(\frac{\sin^2\theta}{8n^2}\right)$$

Differentiating this expression with respect to time gives instantaneous piston speed.

$$V = \frac{\pi LN}{720}\left(\sin\theta + \frac{1}{4n}\sin 2\theta\right) \text{ feet per second,}$$

N being R. P. M. of the crank shaft.

$$a\ (\text{acceleration}) = \frac{dv}{dt} = \frac{\pi LN}{720}\left(\cos\theta + \frac{1}{2n}\cos 2\theta\right)\frac{d\theta}{dt}$$

but $$\frac{d\theta}{dt} = \frac{2\pi N}{60}$$

therefore $$a = \frac{\pi^2N^2L}{21600}\left(\cos\theta + \frac{1}{2n}\cos 2\theta\right) \text{ feet per second per second}$$

The force of acceleration = product of mass and acceleration.

$$Fa = \frac{W}{g}a$$

$$Fa = .0000142\ WLN^2\left(\cos\theta + \frac{1}{2n}\cos 2\theta\right)$$

In this formula, W = weight in pounds of reciprocating parts; L = stroke in inches;

N=crank R. P. M.; $\theta$=angle through which the crank has moved from dead center position; $n$=ratio of connecting rod length to length of stroke.

This formula consists of two terms, i. e., .0000142 $WLN^2 \cos\theta$ and .0000142 $WLN^2 \left(\frac{1}{2n}\cos 2\theta\right)$. The first term is known as the primary inertia force, and the second is known as the secondary inertia force and has twice the frequency of the first since it is a function of $2\theta$, whereas the first force is a function of $\theta$.

Having demonstrated that there are primary and secondary inertia forces and having determined their value, it remains to be shown that the present invention embodies an improvement over the usual method of balancing an eight cylinder 90° V-type engine having a four throw shaft. It will be shown first that the primary inertia forces operating upon any one crank throw can be balanced by a counterweight attached to the crank shaft.

Figure 6:
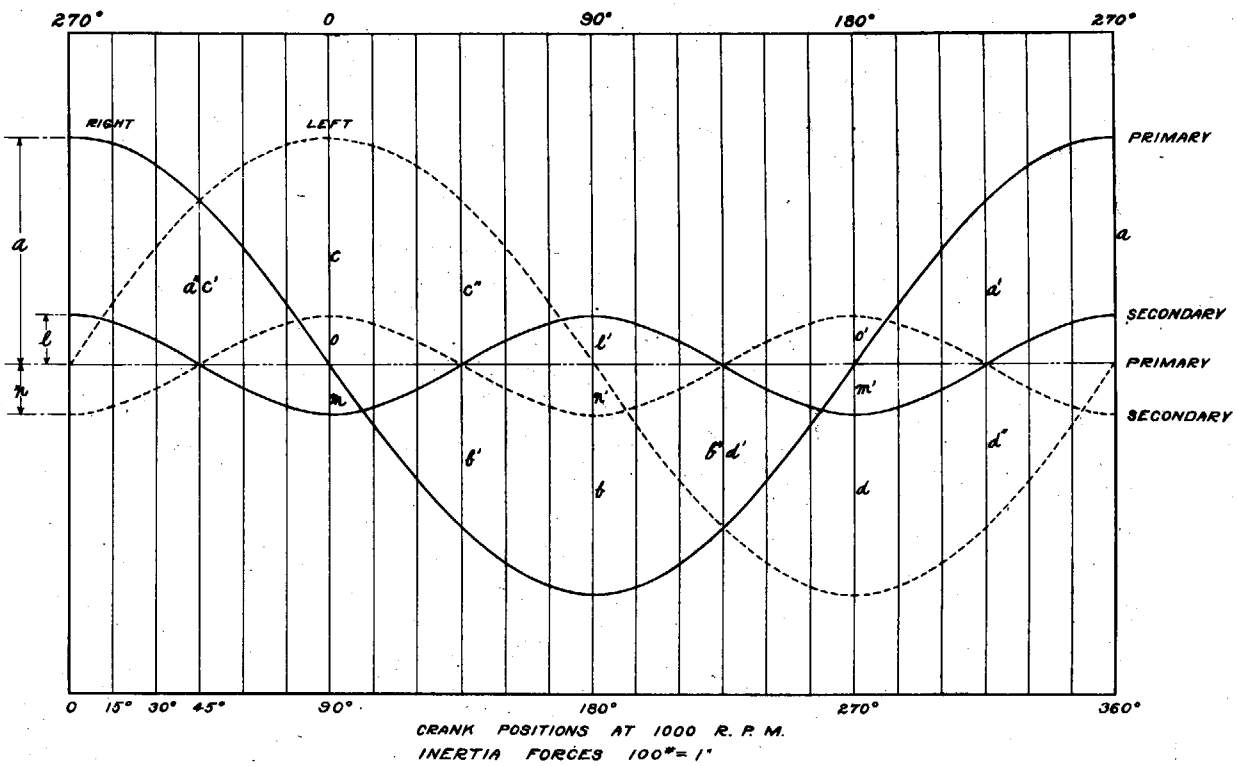
Figure 6 is a preliminary and diagrammatic representation of the inertia forces created by the reciprocating parts and shows values used in making polar diagrams 7 and 8.
Figure 7:
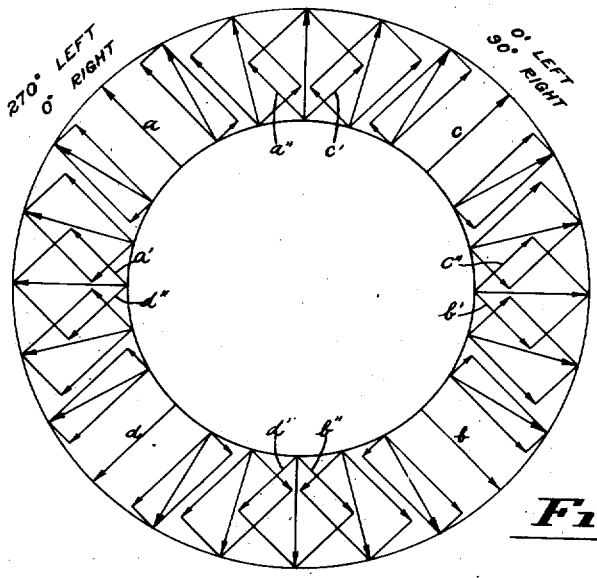
Figure 7 is a polar diagram showing the direction and value of the primary inertia forces as taken from Figure 6 and the resultant of the forces created by two pistons; also that this resultant is of a constant value and radial in direction.

As indicated in Figures 6 and 7 the primary inertia force for one piston of each pair, for example the "right" piston in Figure 5, reaches its maximum $a$ in a given direction and its maximum $b$ in the opposite direction once in each revolution. These figures also indicate that the primary inertia force of the other piston of the pair, the "left" in Figure 5, reaches its maximum $c$ in the same direction and maximum $d$ in the opposite direction once in each revolution, but that the maximum inertia forces of the "right" piston are reached at points 90° ahead of the maximum points of the other piston. Figure 6 shows this quite clearly. In this figure the full line marked "Primary" shows the curve of the primary inertia force for the piston marked "Right" in Figure 5, while the dotted line shows a similar curve for the piston marked "Left", but shows that it reaches its peak above the median line 90° later than the peak for the full line. In Figure 7 the force parallelograms are shown for each 15° of travel of the crank throw. The sides of the parallograms represent the distances from the median line of the curves shown in Figure 6, Figure 7 being drawn to half the scale of Figure 6. The information from which the diagram of Figure 6 was obtained consisted of actual measurements, weights, etc., obtained from a particular case. In laying out the information gained from these curves to form a polar diagram we find that the resultant or geometrical sum of the primary inertia forces of the two pistons at any point has the same value as the resultant at any other point and that it is always radial in direction with respect to the axis of the crank pin.

Referring to Figures 6 and 7, it will be observed that the resultant of the primary inertia forces acting upon any one crank throw is equal to the primary inertia forces due to one of the pistons connected with that crank throw, when the direction of the resultant is parallel to the axis of a cylinder. For example, when the "right" piston is at upper dead center, the inertia force resulting from its motion is equal to $a$, while the inertia force resulting from motion of the left piston is zero. Therefore resultant inertia force equals $a$. Since the resultant of primary inertia forces remain constant while $\theta$ changes from 0° to 360°, then the resultant primary inertia force is always equal to primary inertia force resulting from the motion of one piston when at upper or lower dead center position, or when $\cos\theta=1$. Therefore, the resultant primary inertia force acting upon any crank throw is equal to .0000142 $WLN^2$. The centrifugal force of a mass weighting W pounds and moving at N R. P. M. in a circular path whose radius is $\frac{L}{2}$ inches is expressed by the formula $F=.0000142\ WLN^2$. Therefore, the resultant primary inertia force is equal to the centrifugal force produced by a mass concentrated at the axis of a crank throw and having a weight W equal to the weight of one piston.

It is, of course, understood that W includes the weight of one piston, one wrist pin, and the upper or piston end of one connecting rod, the lower or big end considered merely as a rotating mass concentrated at the axis of a crank throw.

In determining the total weight required to effect the dynamic balance of the shaft, the unweighted shaft is placed upon ordinary balancing machine and weights are applied to the crank throw, each weight having its center of mass coincident with the axis of the throw and equal in weight to the weight of all of the rod and piston parts of one cylinder of a pair plus the weight of the big end of the other rod of the pair. Counterweights are then added at suitable points to effect the dynamic balance.

In applying the counterweights to balance the primary inertia forces a single weight of sufficient size may be placed upon the crank shaft between the first and second pairs of pistons in such a location as to balance the centrifugal effect of the crank throws and big ends of the connecting rods and the primary inertia forces developed by the pairs of pistons and rods connected to these two crank throws. As it may not be practicable to add sufficient weight at this point to take care of all of the unbalanced centrifugal effect, two weights are used, for example 26 and 27, and the total weight of them so divided between them as to permit their being each made symmetrical, as symmetrical weights have a better appearance and are easier to manufacture. With this arrangement of weights the weight 27 may be placed upon the continuation of a line bisecting the angle between the two throws and the weight 26 upon a continuation of the outer web of crank throw 21, and acting in the plane of said throw but oppositely thereto, as shown in Figures 2, 3 and 4. Weights 28 and 29 are similarly placed upon the other half of the shaft.

Figure 8:
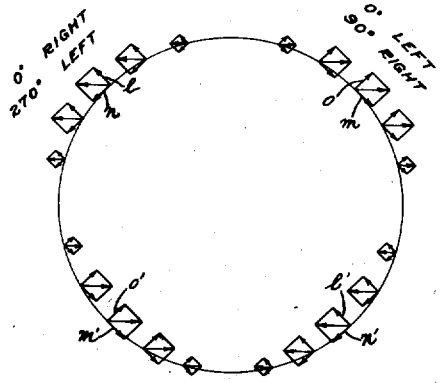
Figure 8 is a polar diagram showing the direction and value of the so-called secondary inertia forces created by two pistons acting on one pin and also the direction and relative value of the resultant of these forces.

Referring again to Figure 6, it will be noted that for a single piston and piston rod the secondary inertia force reaches its maximum value in each of the two directions twice in each revolution as against once for the primary inertia forces. The curve representing the secondary inertia force for one of the pistons of a pair is shown in full lines in Figure 6 and indicated by the word "Secondary." The secondary inertia force developed by the second piston of the pair is indicated by a similar dotted line in Figure 6. The resultants of these secondary forces are, as shown in Figure 8, at their maximum at four points in a revolution, but the direction changes diametrically in the passage from one of these points to the next succeeding point. In a similar manner as for Figures 6 and 7, the parallelograms of forces shown in Figure 8 are drawn using the values indicated in Figure 6 for the secondary inertia forces, using the same scale as Figure 8.

Figure 9:
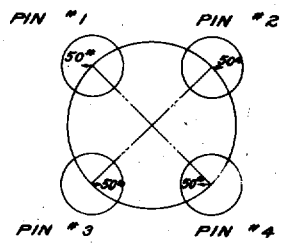
Figure 9 is a diagram showing the direction and value of the secondary forces acting when the pins are at the cylinder center line positions.
Figure 10:
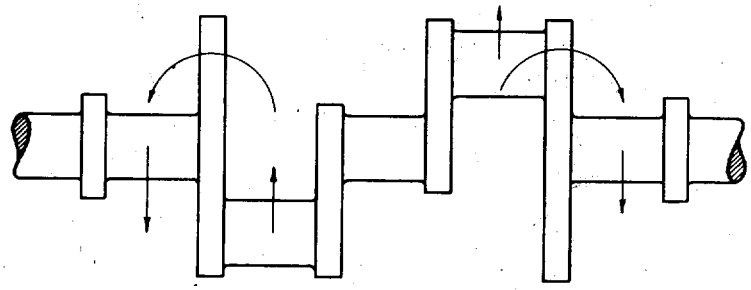
Figure 10 is a diagrammatic view of a shaft, showing the direction of the forces represented in Figure 9.

The secondary inertia forces cannot be balanced by the use of counterweights as their frequency is twice that of engine speed, but they form a balanced system when the crank is constructed so that its end crank throws or pins are oppositely placed in the same plane, and the intermediate crank-pins are oppositely placed in another plane perpendicular to the first plane. This so-called 90° four throw shaft is shown diagrammatically in Figures 9 and 10 which clearly indicate that these secondary inertia forces produce a balanced system of force couples. Figure 9 shows how the force couples tending to produce rotation of the shaft are balanced. Figure 10 shows how the force couples tending to swing the shaft about its center bearing are balanced.

In the conventional 180° four-throw shaft, the primary inertia forces form two equal and opposite couples, and the secondary forces are left unbalanced. The distortional effect of the secondary couples within the shaft itself and the resulting effect upon the bearings is very much less than the corresponding effect of the primary couples in the conventional 180° four-throw shaft, since it is apparent that the maximum value of the secondary inertia force is only about 1/5 the maximum value of the primary inertia force. This fact follows from a comparison of the terms $\cos\theta$ and $\frac{1}{2n}\cos 2\theta$, when $\theta=0°$ and $n=2.5$. The coefficient $\frac{1}{2n}$ becomes $\frac{1}{5}$. Therefore, in an 8-cylinder, 90° V-type engine employing a crank shaft constructed in accordance with the present invention, the tendency to break down the oil film and wear out the shaft bearings is considerably less than in an engine using the conventional 180° four-throw crank.

It therefore will be seen that by constructing the shaft in the manner described, both the primary and secondary inertia forces will be completely balanced out, allowing the production of an engine quite free from objectionable vibration due to reciprocating parts and therefore greatly increasing its life and lessening operation expense.

While the form of embodiment of the invention as described constitutes a preferred form, it is to be understood that other forms might be adopted all coming within the scope of the claims which follow.

What I claim is as follows:

1. An eight cylinder 90° V-type internal combustion engine including a three-bushing four-throw crank shaft, said shaft having its two end crank-throws oppositely placed in the same plane and having the other two crank-throws oppositely placed in another plane perpendicular to the first, said shaft also carrying counterweights, the counterweighting opposite each crank-throw being sufficient to balance the centrifugal effect of a weight, equal to the total weight of all the rod and piston parts for one cylinder of a pair and the big end of the piston rod for the other cylinder of the pair, attached to the crank-throw in such manner that its center of mass coincides with the axis of the crank-throw.

2. An eight cylinder 90° V-type internal combustion engine including a four-throw crank shaft, said shaft having its two end crank-throws oppositely placed in the same plane and having the other two crank-throws oppositely placed in another plane perpendicular to the first, said shaft also carrying counterweights, the counterweighting opposite each crank-throw being sufficient to balance the centrifugal effect of a weight, equal to the total weight of all the rod and piston parts for one cylinder of a pair and the big end of the piston rod for the other cylinder of the pair, attached to the crank-throw in such manner that its center of mass coincides with the axis of the crank-throw.

3. A 90° four-throw crank shaft for an eight cylinder 90° V-type internal combustion engine, said shaft having its two end crank throws oppositely placed in the same plane and having its two intermediate crank-throws oppositely placed in another plane perpendicular to the first plane, said shaft having counterweights constructed and arranged to balance the shaft when each crank-throw carries a weight equal to the total weight of the rod and piston parts for one cylinder of a pair and the big end of the connecting rod for the other cylinder of the pair, said weight having its center of mass coincident with the axis of the crank throw.

In testimony whereof I affix my signature,

THERON P. CHASE.